US 11,441,483 B2

(12) United States Patent
Li et al.

(10) Patent No.: US 11,441,483 B2
(45) Date of Patent: Sep. 13, 2022

(54) SOUNDPROOF CABIN OF TURBINE ENGINE

(71) Applicant: YANTAI JEREH PETROLEUM EQUIPMENT & TECHNOLOGIES CO., LTD., Yantai (CN)

(72) Inventors: Xincheng Li, Yantai (CN); Rikui Zhang, Yantai (CN); Sheng Chang, Yantai (CN); Xiaolei Ji, Yantai (CN); Chunqiang Lan, Yantai (CN); Yipeng Wu, Yantai (CN); Xiance Li, Yantai (CN)

(73) Assignee: Yantai Jereh Petroleum Equipment & Technologies Co., Ltd., Yantai (CN)

( * ) Notice: Subject to any disclaimer, the term of this patent is extended or adjusted under 35 U.S.C. 154(b) by 0 days.

(21) Appl. No.: 16/832,214

(22) Filed: Mar. 27, 2020

(65) Prior Publication Data
US 2021/0071579 A1    Mar. 11, 2021

(30) Foreign Application Priority Data
Sep. 6, 2019  (CN) .......................... 201910843129.1

(51) Int. Cl.
| | |
|---|---|
| *F02C 7/045* | (2006.01) |
| *F02C 7/24* | (2006.01) |
| *F02C 7/052* | (2006.01) |

(52) U.S. Cl.
CPC .............. *F02C 7/045* (2013.01); *F02C 7/24* (2013.01); *F02C 7/052* (2013.01);
(Continued)

(58) Field of Classification Search
CPC ......... F02C 7/045; F02C 7/24; F05D 2240/14
See application file for complete search history.

(56) References Cited

U.S. PATENT DOCUMENTS

| | | | | |
|---|---|---|---|---|
| 6,134,878 A | * | 10/2000 | Amako | ................... F02C 7/045 60/39.83 |
| 2010/0077754 A1 | * | 4/2010 | Jangili | ................... F02C 7/045 60/725 |

(Continued)

FOREIGN PATENT DOCUMENTS

| | | |
|---|---|---|
| CN | 101713335 A | 5/2010 |
| CN | 201963435 U | 9/2011 |

(Continued)

OTHER PUBLICATIONS

International Search Report dated on Jun. 11, 2020, corresponding PCT/CN2019/104716, with English translation, 6 pages.

(Continued)

*Primary Examiner* — Moshe Wilensky
*Assistant Examiner* — Kyle A Cook
(74) *Attorney, Agent, or Firm* — Crowell & Moring LLP

(57) ABSTRACT

The present invention discloses a soundproof cabin of a turbine engine. The soundproof cabin is sleeved on the turbine engine. The soundproof cabin includes a cabin body, an intake noise reduction unit and a ventilation noise reduction unit, wherein the intake noise reduction unit and the ventilation noise reduction unit are disposed on the cabin body, the surrounding of which is filled with soundproof materials, the intake noise reduction unit is used to reduce the induction noise of the turbine engine, the ventilation noise reduction unit is used to reduce the noise of the ventilation system of the turbine engine. Beneficial effects: an intake noise reduction unit is disposed at an air inlet of the turbine engine to reduce the induction noise of the turbine engine; a ventilation noise reduction unit is disposed on the transmission direction of the turbine engine to reduce the ventilation and cooling noise of the turbine engine; the surrounding of the turbine engine is filled with soundproof materials to achieve the overall noise reduction around the turbine engine.

10 Claims, 2 Drawing Sheets

(52) U.S. Cl.
CPC .... *F05D 2240/14* (2013.01); *F05D 2260/607* (2013.01); *F05D 2260/96* (2013.01)

(56) References Cited

U.S. PATENT DOCUMENTS

| | | | | |
|---|---|---|---|---|
| 2011/0162383 | A1* | 7/2011 | Zhang | F01N 1/14 60/782 |
| 2014/0130422 | A1* | 5/2014 | Laing | F01D 25/24 52/79.5 |
| 2016/0248230 | A1* | 8/2016 | Tawy | F01D 25/285 |
| 2018/0030895 | A1* | 2/2018 | Laing | F02C 7/04 |
| 2018/0195435 | A1* | 7/2018 | Zhang | F02C 7/045 |
| 2019/0295520 | A1* | 9/2019 | Johnson | B32B 27/30 |

FOREIGN PATENT DOCUMENTS

| | | |
|---|---|---|
| CN | 205578120 U | 9/2016 |
| CN | 106499507 A | 3/2017 |
| CN | 109578142 A | 4/2019 |

OTHER PUBLICATIONS

Written Opinion dated Jun. 11, 2020, corresponding PCT/CN2019/104716, 4 pages.

* cited by examiner

SOUNDPROOF CABIN OF TURBINE ENGINE

TECHNICAL FIELD

The present invention relates to the technical field of noise reduction, and specifically to a soundproof cabin of a turbine engine.

BACKGROUND

In fracturing operation site of oil and gas fields all over the world, noise disturbance from fracturing equipment has been bothering oilfield service companies for a long time. Especially in some well sites close to residential areas, the noise causes the equipment to be unable to operate at night, thus delaying the fracturing process.

With the development of fracturing equipment technology, fracturing equipment with turbine engine as the power source appears. Although the turbine engine has many advantages compared with traditional diesel engines, for example, it has a high single power density, it can use 100% natural gas as the fuel to reduce the construction cost, etc. However, turbine engines are much noisier than diesel engines, and this problem has not been effectively addressed.

Therefore, there is an urgent need for a soundproof cabin of a turbine engine to solve the problem of turbine engine noise.

SUMMARY

To overcome the deficiencies in the prior art, an objective of the present invention is to provide a soundproof cabin of a turbine engine, an intake noise reduction unit is disposed at an air inlet of the turbine engine to reduce the induction noise of the turbine engine; a ventilation noise reduction unit is disposed on the transmission direction of the turbine engine to reduce the ventilation and cooling noise of the turbine engine; the surrounding of the turbine engine is filled with soundproof materials to achieve the overall noise reduction around the turbine engine.

The objective of the present invention is achieved by the following technical measures: a soundproof cabin of a turbine engine, the soundproof cabin is sleeved on the turbine engine, the soundproof cabin includes a cabin body and an intake noise reduction unit; the intake noise reduction unit is disposed on the cabin body, the surrounding of the cabin body is filled with soundproof materials; the intake noise reduction unit is used to reduce the induction noise of the turbine engine, the intake noise reduction unit is arranged on the top of the cabin body.

Further, the intake noise reduction unit includes an intake filter, an intake silencer, an intake chamber and an intake piping, the intake chamber is disposed on the top of the cabin body, the intake filter is arranged on the outer side face of the intake chamber, and the intake silencer is arranged on the inner side face of the intake chamber, with the position of the intake filter corresponding to that of the intake silencer; the intake chamber is connected to an air inlet of the turbine engine through the intake piping.

Further, there are no intake filters and intake silencers arranged at the exhaust end of the turbine engine.

Further, the ventilation noise reduction unit includes an inlet air silencer, an inlet air fan and an outlet air silencer, the inlet air silencer is connected to the inlet air fan; the inlet air silencer, the inlet air fan and the outlet air silencer are disposed on the cabin body, and the inlet air silencer and the outlet air silencer are arranged on opposite sides of the cabin body.

Further, there are one or more sets of ventilation noise reduction unit.

Further, the turbine engine is provided with a soundproof door in non-transmission direction, the soundproof door is filled with soundproof materials.

Compared with the prior art, the present invention has the following beneficial effects: an intake noise reduction unit is disposed at an air inlet of the turbine engine to reduce the Induction noise of the turbine engine; a ventilation noise reduction unit is disposed on the transmission direction of the turbine engine to reduce the ventilation and cooling noise of the turbine engine; the surrounding of the turbine engine is filled with soundproof materials to achieve the overall noise reduction around the turbine engine. A soundproof door filled with soundproof materials is arranged for noise insulation of the turbine engine in non-transmission direction, and convenient for repair and daily maintenance.

The present invention will be described in detail below with reference to the accompanying drawings and specific implementations.

Wherein, 1. outlet air silencer, 2. intake chamber, 3. soundproof door, 4. inlet air silencer, 5. intake silencer, 6. intake filter, 7. turbine engine, 8. intake piping, 9. inlet air fan, 10. exhaust duct 11. cabin body, 12. baseplate, 13. an upright rectangular frame, 14. the opening at the top of the rectangular frame, 15. first plate, 16. second plate, 17. third plate, and 18. fourth plate.

DESCRIPTION OF THE EMBODIMENTS

Figure 1:
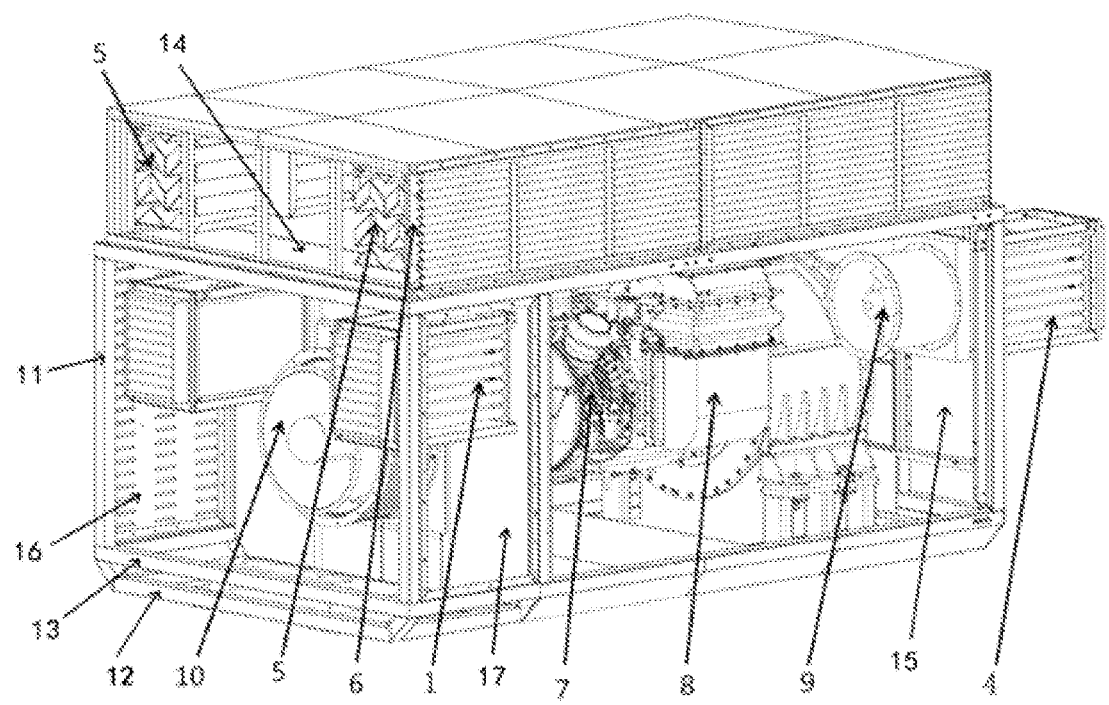
FIG. 1 is a schematic structural diagram of a soundproof cabin of a turbine engine.
Figure 2:
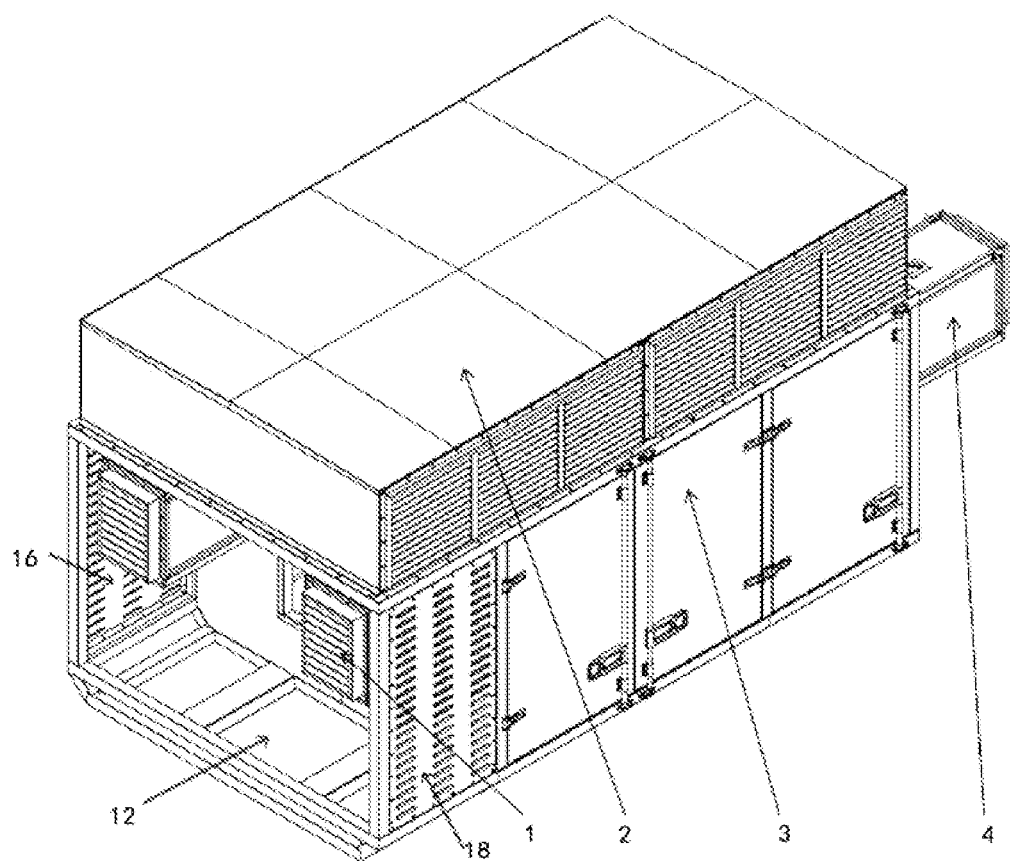
FIG. 2 is a schematic diagram of external structure of a soundproof cabin of a turbine engine.

As shown in FIGS. 1 to 2, a soundproof cabin of a turbine engine, the soundproof cabin is sleeved on the turbine engine 7; the soundproof cabin includes a cabin body 11, an intake noise reduction unit and a ventilation noise reduction unit; the intake noise reduction unit and the ventilation noise reduction unit are disposed on the cabin body 11, the surrounding of the cabin body 11 frame is filled with soundproof materials; the intake noise reduction unit is used to reduce the induction noise of the turbine engine 7, and the ventilation noise reduction unit is used to reduce the noise of the ventilation system of the turbine engine 7. The soundproof materials may be glass fiber cotton, rock wool, polyurethane, aluminum honeycomb panels, peak type cotton, etc.

The intake noise reduction unit includes an intake filter 6, an intake silencer 5, an intake chamber 2 and an intake piping, the intake chamber 2 is disposed on the top of the cabin body 11, the intake filter 6 is arranged on the outer side face of the intake chamber 2, and the intake silencer 5 is arranged on the inner side face of the intake chamber 2, with the position of the intake filter 6 corresponding to that of the intake silencer 5; the bottom of the intake chamber 2 is provided with an air outlet, through which the intake chamber 2 is connected to one end of the intake piping, and the other end of the intake piping is connected to an air inlet of the turbine engine 7. Both the top and bottom surfaces of the intake chamber 2 are filled with soundproof materials.

There are no intake filters 6 and intake silencers 5 arranged at the exhaust end of the turbine engine 7. The exhaust end is the end at which the exhaust duct 10 of the turbine engine 7 is disposed. The side face of the intake chamber 2 at the side of the exhaust end can also be filled with soundproof materials.

The ventilation noise reduction unit includes an inlet air silencer 4, an inlet air fan and an outlet air silencer 1, wherein the inlet air silencer 4 is connected to the inlet air fan; the inlet air silencer 4, the inlet air fan and the outlet air silencer 1 are disposed on the cabin body; and the inlet air silencer 4 and the outlet air silencer 1 are arranged on opposite sides of the cabin body.

There are one or more sets of ventilation noise reduction unit. For example, either side of the transmission direction of the turbine engine 7 can be provided with a set of ventilation noise reduction unit, and there may be one or two outlet air silencers 1 in each set of ventilation noise reduction unit, thus better playing the role of ventilation and noise reduction.

The turbine engine 7 is provided with a soundproof door 3 in non-transmission direction, which is filled with soundproof materials. There may be multiple soundproof doors 3. The multiple soundproof doors filled with soundproof materials can be used for noise insulation of the turbine engine 7 in non-transmission direction, and also convenient for repair and daily maintenance.

The intake noise reduction unit comprises an intake chamber and an intake piping, the intake chamber is arranged on the top of the cabin body 11, the corresponding two sides of the intake chamber are provided with an intake filter and an intake silencer successively from outside to inside, and the intake chamber is connected to an air inlet of the turbine engine through the intake piping arranged at the bottom of the intake chamber. the cabin body 11 is a rectangular cabin comprising a baseplate 12 and an upright rectangular frame 13, the baseplate 12 seals the bottom of the rectangular frame, and the intake noise reduction unit can cover the opening at the top of the rectangular frame. the rectangular frame comprises four side plates, that are the first plate 15, the second plate 16, the third plate 17 and the fourth plate 18 respectively; the first plate 15 and the third plate 17 are arranged in parallel, and the second plate 16 and the fourth plate 18 are arranged in parallel.

Operating Principle:

The air used for combustion in the turbine engine 7 is fed through the intake filter 6, enters the intake chamber 2 through the intake silencer 5, and then enters the air inlet of the turbine engine 7 through the intake piping.

The air used for ventilation and cooling in the turbine engine 7 is fed, under the action of the inlet air fan, into the soundproof cabin of the engine through the inlet air silencer 4, and then discharged to the outside of the soundproof cabin of the engine through the outlet air silencer 1.

It will be appreciated to persons skilled in the art that the present invention is not limited to the foregoing embodiments, which together with the context described in the specification are only used to illustrate the principle of the present invention. Various changes and improvements may be made to the present invention without departing from the spirit and scope of the present invention. All these changes and improvements shall fall within the protection scope of the present invention. The protection scope of the present invention is defined by the appended claims and equivalents thereof.

What is claimed is:

1. A soundproof cabin of a turbine engine, wherein the soundproof cabin is sleeved on the turbine engine; the soundproof cabin comprises a cabin body and an intake noise reduction unit; the intake noise reduction unit is disposed on the cabin body, the surrounding of the cabin body is filled with soundproof materials; the intake noise reduction unit is configured to reduce induction noise of the turbine engine, the intake noise reduction unit is arranged on a top of the cabin body and comprises an intake chamber, and combustion air for the turbine engine is configured to enter the intake chamber from two opposite side surfaces of the intake chamber in a direction perpendicular to axial transmission of the turbine engine, wherein in a plan view, the intake chamber completely covers the turbine engine and an upper opening of the cabin body that is delimited by a frame of the cabin body.

2. The soundproof cabin of the turbine engine according to claim 1, wherein the cabin body is provided with a soundproof door in a non-transmission direction, the soundproof door is filled with the soundproof materials.

3. The soundproof cabin of the turbine engine according to claim 1, wherein in a plan view, an area of the intake chamber is substantially the same as an area of the cabin body.

4. The soundproof cabin of the turbine engine according to claim 1, wherein the soundproof cabin further comprises a ventilation noise reduction unit, the ventilation noise reduction unit is used to reduce the noise of a ventilation system of the turbine engine.

5. The soundproof cabin of the turbine engine according to claim 4, wherein the ventilation noise reduction unit comprises an inlet air silencer, an inlet air fan and an outlet air silencer, the inlet air silencer is connected to the inlet air fan; the inlet air silencer, the inlet air fan and the outlet air silencer are disposed on the cabin body, and the inlet air silencer and the outlet air silencer are arranged on opposite sides of the cabin body.

6. The soundproof cabin of the turbine engine according to claim 4, wherein there are one or more sets of the ventilation noise reduction unit.

7. The soundproof cabin of the turbine engine according to claim 1, wherein the intake noise reduction unit comprises an intake piping, the intake chamber is arranged on the top of the cabin body, each of the two opposite side surfaces of the intake chamber is provided with an intake filter and an intake silencer successively from outside to inside, both top and bottom surfaces of the intake chamber are filled with the soundproof materials, and the intake chamber is connected to an air inlet of the turbine engine through the intake piping arranged at a bottom of the intake chamber.

8. The soundproof cabin of the turbine engine according to claim 7, wherein there are no intake filters and intake silencers arranged at an exhaust end of the turbine engine.

9. The soundproof cabin of the turbine engine according to claim 7, wherein the cabin body is a rectangular cabin comprising a baseplate and an upright rectangular frame, the baseplate is at a bottom of the rectangular frame, and the intake noise reduction unit is configured to cover the upper opening at a top of the rectangular frame.

10. The soundproof cabin of the turbine engine according to claim 9, wherein the rectangular frame comprises four side plates, that are a first plate, a second plate, a third plate and a fourth plate respectively; the first plate and the third plate are arranged in parallel, and the second plate and the fourth plate are arranged in parallel.

* * * * *